(12) United States Patent
Salowe

(10) Patent No.: US 9,003,349 B1
(45) Date of Patent: *Apr. 7, 2015

(54) METHODS, SYSTEMS, AND ARTICLES OF MANUFACTURE FOR IMPLEMENTING A PHYSICAL ELECTRONIC DESIGN WITH AREA-BOUNDED TRACKS

(71) Applicant: Cadence Design Systems, Inc., San Jose, CA (US)

(72) Inventor: Jeffrey Salowe, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,503

(22) Filed: Jun. 28, 2013

(51) Int. Cl.
*G06F 17/50* (2006.01)

(52) U.S. Cl.
CPC ........ *G06F 17/5081* (2013.01); *G06F 17/5077* (2013.01); *G06F 17/5072* (2013.01)

(58) Field of Classification Search
CPC ............ G06F 17/5077; G06F 17/5072; G06F 17/5081
USPC ............. 716/129, 130, 131, 122, 123; 703/15
See application file for complete search history.

(56) References Cited

U.S. PATENT DOCUMENTS

| | | | |
|---|---|---|---|
| 2,915,831 A | 12/1959 | Parker | |
| 4,484,292 A | 11/1984 | Hong et al. | |
| 4,811,237 A | 3/1989 | Putatunda et al. | |
| 5,535,134 A | 7/1996 | Cohn et al. | |
| 5,644,500 A | 7/1997 | Miura et al. | |
| 5,729,469 A | * 3/1998 | Kawakami | 716/129 |
| 5,770,481 A | * 6/1998 | Fujii | 438/129 |
| 5,781,446 A | 7/1998 | Wu | |
| 5,801,959 A | 9/1998 | Ding et al. | |
| 6,011,912 A | 1/2000 | Yui et al. | |
| 6,298,468 B1 | 10/2001 | Zhen | |
| 6,324,675 B1 | 11/2001 | Dutta et al. | |
| 6,349,403 B1 | 2/2002 | Dutta et al. | |
| 6,370,673 B1 | 4/2002 | Hill | |
| 6,407,434 B1 | 6/2002 | Rostoker et al. | |
| 6,490,713 B2 | 12/2002 | Matsumoto | |
| 6,505,333 B1 | 1/2003 | Tanaka | |
| 6,543,041 B1 | 4/2003 | Scheffer et al. | |
| 6,557,145 B2 | 4/2003 | Boyle et al. | |

(Continued)

OTHER PUBLICATIONS

Non-Final Office Action dated Oct. 28, 2013 for U.S. Appl. No. 13/931,707.

(Continued)

*Primary Examiner* — Phallaka Kik
(74) *Attorney, Agent, or Firm* — Vista IP Law Group, LLP

(57) ABSTRACT

Disclosed are methods, systems, and articles of manufacture for implementing a physical electronic design with area-bounded tracks. One aspect identifies an area in an electronic design and a track pattern associated with the area, identifies active tracks in the track pattern, and creates spacetiles with the active tracks. This aspect uses area-based search probes based on spacetiles to find viable implementation solutions to implement the area in the electronic design. Another aspect identifies a tracked area associated with a track pattern and a trackless area and use spacetile(s) and a via spacetile layer to transition between the tracked area and the trackless area for implementation of the electronic design in the tracked or the trackless area of the electronic design.

25 Claims, 13 Drawing Sheets

(56) References Cited

U.S. PATENT DOCUMENTS

| | | |
|---|---|---|
| 6,557,153 B1 | 4/2003 | Dahl et al. |
| 6,609,237 B1 * | 8/2003 | Hamawaki et al. ............ 716/131 |
| 6,763,512 B2 | 7/2004 | Xing |
| 6,769,105 B1 | 7/2004 | Teig et al. |
| 6,851,100 B1 | 2/2005 | You et al. |
| 6,892,371 B1 | 5/2005 | Teig et al. |
| 6,931,616 B2 | 8/2005 | Teig et al. |
| 6,938,226 B2 | 8/2005 | Nguyen et al. |
| 6,938,234 B1 | 8/2005 | Teig et al. |
| 6,957,407 B2 | 10/2005 | Suto |
| 6,957,411 B1 | 10/2005 | Teig et al. |
| 6,981,235 B1 | 12/2005 | Salowe et al. |
| 6,996,512 B2 | 2/2006 | Alpert et al. |
| 7,016,794 B2 | 3/2006 | Schultz |
| 7,039,881 B2 | 5/2006 | Regan |
| 7,051,313 B1 | 5/2006 | Betz et al. |
| 7,076,750 B1 | 7/2006 | Lukanc |
| 7,089,526 B1 | 8/2006 | Salowe et al. |
| 7,096,445 B1 | 8/2006 | Pucci et al. |
| 7,100,128 B1 | 8/2006 | Nequist et al. |
| 7,107,564 B1 | 9/2006 | Teig et al. |
| 7,117,468 B1 | 10/2006 | Teig et al. |
| 7,139,993 B2 | 11/2006 | Proebsting et al. |
| 7,222,322 B1 | 5/2007 | Chyan et al. |
| 7,257,797 B1 | 8/2007 | Waller et al. |
| 7,363,607 B2 | 4/2008 | Birch et al. |
| 7,516,433 B1 | 4/2009 | Pucci et al. |
| 7,523,430 B1 | 4/2009 | Patel |
| 7,594,214 B1 | 9/2009 | Salowe et al. |
| 7,640,520 B2 | 12/2009 | Wang et al. |
| 7,694,261 B1 | 4/2010 | Chyan et al. |
| 7,735,043 B2 | 6/2010 | Ueda |
| 7,752,590 B1 | 7/2010 | Chyan et al. |
| 7,802,208 B1 | 9/2010 | Waller et al. |
| 7,890,909 B2 | 2/2011 | Pyapali et al. |
| 7,934,177 B2 | 4/2011 | Shin et al. |
| 7,958,480 B1 | 6/2011 | Slonim et al. |
| 8,006,216 B1 | 8/2011 | Chen et al. |
| 8,028,253 B2 | 9/2011 | Drapeau |
| 8,032,856 B2 | 10/2011 | Itagaki |
| 8,045,546 B1 | 10/2011 | Bao et al. |
| 8,050,256 B1 | 11/2011 | Bao et al. |
| 8,108,823 B2 | 1/2012 | Allen et al. |
| 8,239,806 B2 | 8/2012 | Chen et al. |
| 8,250,507 B1 | 8/2012 | Agarwal et al. |
| 8,286,111 B2 | 10/2012 | Chandra et al. |
| 8,375,348 B1 | 2/2013 | Raj et al. |
| 8,418,110 B2 | 4/2013 | Keinert et al. |
| 8,473,885 B2 | 6/2013 | Cohn et al. |
| 8,495,547 B2 | 7/2013 | Keinert et al. |
| 8,495,549 B2 * | 7/2013 | Maruyama et al. ............ 716/126 |
| 8,510,703 B1 * | 8/2013 | Wadland et al. ............... 716/129 |
| 8,560,998 B1 | 10/2013 | Salowe et al. |
| 8,612,914 B2 | 12/2013 | Sherlekar et al. |
| 8,640,080 B1 | 1/2014 | Salowe et al. |
| 8,645,893 B1 | 2/2014 | Yeung et al. |
| 8,671,368 B1 | 3/2014 | Salowe et al. |
| 8,683,418 B2 * | 3/2014 | Bose et al. .................... 716/133 |
| 8,689,121 B2 | 4/2014 | O'Riordan |
| 8,737,392 B1 | 5/2014 | Bao et al. |
| 8,769,455 B1 | 7/2014 | Singh et al. |
| 2001/0038612 A1 | 11/2001 | Vaughn |
| 2003/0014201 A1 | 1/2003 | Schultz |
| 2003/0084418 A1 | 5/2003 | Regan |
| 2003/0126578 A1 | 7/2003 | Wadland et al. |
| 2004/0143797 A1 | 7/2004 | Nguyen et al. |
| 2006/0288323 A1 | 12/2006 | Birch |
| 2007/0101303 A1 | 5/2007 | Lien |
| 2007/0106969 A1 | 5/2007 | Birch et al. |
| 2007/0162884 A1 | 7/2007 | Matsuno et al. |
| 2007/0245286 A1 | 10/2007 | Ueda |
| 2008/0072182 A1 | 3/2008 | He et al. |
| 2008/0244504 A1 | 10/2008 | Drapeau |
| 2009/0055792 A1 * | 2/2009 | Itagaki ............................ 716/13 |
| 2009/0144688 A1 | 6/2009 | Uchino et al. |
| 2009/0172628 A1 | 7/2009 | Chyan |
| 2010/0011327 A1 * | 1/2010 | Becker et al. .................... 716/8 |
| 2010/0037200 A1 | 2/2010 | Ghan |
| 2010/0100862 A1 | 4/2010 | Ohtsuka |
| 2010/0106274 A1 | 4/2010 | Konno et al. |
| 2010/0115479 A1 | 5/2010 | Hatano et al. |
| 2010/0122228 A1 | 5/2010 | McCracken et al. |
| 2010/0199253 A1 | 8/2010 | Cheng et al. |
| 2010/0205575 A1 | 8/2010 | Arora et al. |
| 2010/0229140 A1 | 9/2010 | Strolenberg et al. |
| 2010/0306727 A1 | 12/2010 | Itagaki |
| 2011/0014786 A1 | 1/2011 | Sezginer |
| 2011/0055784 A1 | 3/2011 | Gao et al. |
| 2011/0119648 A1 | 5/2011 | Chen et al. |
| 2011/0185329 A1 | 7/2011 | Wen et al. |
| 2011/0214100 A1 | 9/2011 | McElvain |
| 2011/0219341 A1 | 9/2011 | Cao et al. |
| 2011/0260318 A1 | 10/2011 | Eisenstadt |
| 2011/0296360 A1 | 12/2011 | Wang et al. |
| 2012/0079442 A1 * | 3/2012 | Akar et al. ..................... 716/112 |
| 2012/0131528 A1 | 5/2012 | Chen et al. |
| 2012/0241986 A1 | 9/2012 | Sherlekar et al. |
| 2012/0286331 A1 | 11/2012 | Aton et al. |
| 2013/0019220 A1 * | 1/2013 | Maruyama et al. ............ 716/126 |
| 2013/0036396 A1 * | 2/2013 | Arayama et al. ............... 716/119 |
| 2013/0086543 A1 | 4/2013 | Agarwal et al. |
| 2013/0086545 A1 | 4/2013 | Alpert et al. |
| 2013/0155555 A1 | 6/2013 | Blanc et al. |
| 2013/0159965 A1 | 6/2013 | Karatal et al. |
| 2014/0157220 A1 * | 6/2014 | Arayama et al. ............... 716/119 |
| 2014/0167117 A1 | 6/2014 | Quandt et al. |

OTHER PUBLICATIONS

Non-Final Office Action dated Dec. 6, 2013 for U.S. Appl. No. 13/931,689.

Final Office Action dated May 1, 2014 for U.S. Appl. No. 13/931,707.

Notice of Allowance dated Jun. 4, 2014 for U.S. Appl. No. 13/931,689.

Non-Final Office Action dated Jun. 13, 2014 for U.S. Appl. No. 13/931,627.

Li et al., "NEMO: A New Implicit-Connection Graph-Based Gridless Router With Multilayer Planes and Pseudo Tile Propagation," IEEE Trans. on CAD of ICs & Systems, vol. 26, No. 4 Apr. 2007, pp. 705-718.

Lin et al., "Double Patterning Lithography Aware Grid less Detailed Routing with Innovative Conflict Graph," DAC'10, Jun. 13-18, 2010, pp. 398-403.

Agilent Technologies, "Momentum", 2006, Agilient, pp. 1-40.

Cho et al., "Double Patterning Technology Friendly Detailed Routing", IEEE/ACM International Conference, 2008, pp. 506-511.

Dion et al., Contour: A Tile-based Gridless Router, 30 pages, Western Research Laboratory, Mar. 1995.

Non-Final Office Action dated Aug. 4, 2014 for U.S. Appl. No. 13/931,568.

Non-Final Office Action dated Jul. 15, 2014 for U.S. Appl. No. 14/044,836.

Hsu et al., "Template-Mask Design Methodology for Double Patterning Technology," 2010 IEEE, pp. 107-111.

Hwang, Chanseok, and Massoud Pedram. "Interconnect design methods for memory design." Proceedings of the 2004 Asia and South Pacific Design Automation Conference. IEEE Press, 2004.

Jeffrey Salowe, "Gridding for Advanced Process Nodes" 2012.

Jones, David L., "PCB Design Tutorial, Revision A", Jun. 29, 2004, David L. Jones and www.alternatezone.com, pp. 1-25.

Lin, I-Jye, Tsui-Yee Ling, and Yao-Wen Chang. "Statistical circuit optimization considering device and interconnect process variations." Proceedings of the 2007 international workshop on System level interconnect prediction. ACM, 2007.

Ou, Hung-Chih, Hsing-Chih Chang Chien, and Yao-Wen Chang. "Simultaneous analog placement and routing with current flow and current density considerations." Proceedings of the 50th Annual Design Automation Conference. ACM, 2013.

Pompl, T., et al. "Practical aspects of reliability analysis for IC designs." Proceedings of the 43rd annual Design Automation Conference. ACM, 2006.

(56) References Cited

OTHER PUBLICATIONS

Singh, Jaskirat, and Sachin S. Sapatnekar. "Topology optimization of structured power/ground networks." Proceedings of the 2004 international symposium on Physical design. ACM, 2004.
U.S. Appl. No. 13/602,069, filed Aug. 31, 2012.
U.S. Appl. No. 13/602,071, filed Aug. 31, 2012.
U.S. Appl. No. 13/692,970, filed Dec. 3, 2012.
U.S. Appl. No. 13/705,164, filed Dec. 4, 2012.
Wang, Laung-Terng, Charles E. Stroud, and Nur A. Touba. System-on-chip test architectures: nanometer design for testability. Morgan Kaufmann, 2010.
Final Office Action dated Nov. 13, 2014 for U.S. Appl. No. 14/044,836.
Final Office Action dated Nov. 17, 2014 for U.S. Appl. No. 13/931,627.
Non-Final Office Action dated Dec. 19, 2014 for U.S. Appl. No. 14/318,507.
Final Office Action dated Dec. 31, 2014 for U.S. Appl. No. 13/931,568.
Notice of Allowance dated Dec. 31, 2014 for U.S. Appl. No. 13/931,689.

* cited by examiner

METHODS, SYSTEMS, AND ARTICLES OF MANUFACTURE FOR IMPLEMENTING A PHYSICAL ELECTRONIC DESIGN WITH AREA-BOUNDED TRACKS

CROSS-REFERENCE TO RELATED APPLICATION(S)

This application is related to U.S. patent application Ser. No. 13/931,568 entitled "METHODS, SYSTEMS, AND ARTICLES OF MANUFACTURE FOR INTERACTIVELY IMPLEMENTING PHYSICAL ELECTRONIC DESIGNS WITH TRACK PATTERNS", U.S. patent application Ser. No. 13/931,627 entitled "METHODS, SYSTEMS, AND ARTICLES OF MANUFACTURE FOR ASSIGNING TRACK PATTERNS TO REGIONS OF AN ELECTRONIC DESIGN", U.S. patent application Ser. No. 13/931,689 entitled "METHODS, SYSTEMS, AND ARTICLES OF MANUFACTURE FOR ASSOCIATING TRACK PATTERNS WITH ROUTING FOR ELECTRONIC DESIGNS", and U.S. patent application Ser. No. 13/931,707 entitled "METHODS, SYSTEMS, AND ARTICLES OF MANUFACTURE FOR AUTOMATICALLY ASSIGNING TRACK PATTERNS TO REGIONS FOR PHYSICAL IMPLEMENTATION OF AN ELECTRONIC DESIGN", the content of all four U.S. patent applications is hereby expressly incorporated by reference in its entirety for all purposes.

This application is further related to U.S. patent application Ser. No. 13/602,071, entitled "METHODS, SYSTEMS, AND ARTICLES OF MANUFACTURE FOR ROUTING AN ELECTRONIC DESIGN USING SPACETILES" and filed on Aug. 31, 2012. and U.S. patent application Ser. No. 13/602,069, entitled "METHODS, SYSTEMS, AND ARTICLES OF MANUFACTURE FOR ROUTING AN ELECTRONIC DESIGN USING SPACETILES" and filed on Aug. 31, 2012, the content of both U.S. patent applications is hereby incorporated by reference in its entirety for all purposes.

COPYRIGHT NOTICE

A portion of the disclosure of this patent document includes material, which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

Many phases of these electronic design activities may be performed with computer aided design (CAD) tools or electronic design automation (EDA) systems. For example, an integrated circuit designer may use a set of layout EDA application programs, such as a layout editor, to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. The EDA layout editing tools are often performed interactively so that the designer can review and provide careful control over the details of the electronic design.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. The task of all routers is the same—routers are given some pre-existing polygons consisting of pins on cells and optionally some pre-routes from the placers to create geometries so that all pins assigned to different nets are connected by wires and vias, that all wires and vias assigned to different nets do not overlap, and that all design rules are obeyed. That is, a router fails when two pins on the same net that should be connected are open, when two pins on two different nets that should remain open are shorted, or when some design rules are violated during routing.

A layout file is created from the placement and routing process, which assigns logic cells to physical locations in the device layout and routes their interconnections. The physical layout is typically described as many patterned layers, and the pattern of each layer is described by the union of a set of polygons. The layout data set is stored, for example in GDSII ("Graphic Data System II") or OASIS ("Open Artwork System Interchange Standard") formats. Component devices and interconnections of the integrated circuit are constructed layer by layer. A layer is deposited on the wafer and then it is patterned using a photolithography process and an etch process.

Traditionally, layout track patterns include parallel tracks with uniform pitches, and the tracks cover entire coordinate space. This conventional approach does not satisfy the needs for electronic layout with a typical half-pitch of 14 nm or below. With the typical half-pitch advancing to 14 nm or below, the track patterns for a certain metal layer may be required or desired to be region based where one track pattern may be associated with or assigned to a region on one layer, while another track pattern may be associated with or assigned to another region on the same layer. Some designs may even demand or desire non-uniform track patterns. Conventional approaches also do not allow periodic changes of track pitches and definitions of regions where one or more track patterns are active. These track pattern requirements pose a challenge for physical design implementation, especially for interactive layout editing. In addition, users may need to interactively define the track patterns during the chip floorplanning or placement stage and follow these track patterns during subsequent physical design stages such as routing, post-layout optimization, engineering change order (ECO), or even specific physical design tasks such as wire editing.

In addition, advanced manufacturing groups have new requirements on where wires or interconnects may be routed. In particular, some routing tracks are intended for double-width wires, some are intended for single-width wires, and so on. Routing tracks, as they were originally devised, applied to every net or connection in the design. To address this, the user must explicitly add the constraints of the track patterns to the routing rules, which is impractical and prone to errors. Moreover, there has been no way to address trackPattern constraints on automatically-generated rules. Some advanced technologies have complex grid requirements. One such requirement is to restrict routing grids in a particular area. Another approach is to give several possible sets of grids, and then to assign one to a given area. The current track pattern representation applies to an entire layer. There is no representation that limits the bounds of a track pattern. Nor is there a representation that maps track patterns to a particular area Thus, there exists a need for methods, systems, and articles of manufacture for assigning track patterns to regions of an electronic design.

SUMMARY

Disclosed are method(s), system(s), and article(s) of manufacture for implementing a physical electronic design with area-bounded tracks in one or more embodiments. Advanced design groups are adding complex track requirement that the detail router must honor, otherwise it is a violation. One such rule is to place an area bound on a track pattern. Various embodiments make a legal connection where the centerline of each wire is on track, and the centerline does not extend past the track pattern boundary. Some embodiments may implement an electronic design between a gridded or gridded region on a layer and a gridless or trackless region on the same layer as an on-track region. Different track patterns may be associated with different wire widths.

Disclosed are methods, systems, and articles of manufacture for implementing a physical electronic design with area-bounded tracks. Some embodiments identify an area in an electronic design and a track pattern or a track pattern group that is associated with the area, identify one or more active tracks in the track pattern or track pattern group, and creates one or more spacetiles with the one or more active tracks. These embodiments use one or more area-based search probes based at in part on the one or more spacetiles to find viable implementation solutions to implement the area in the electronic design. Some of these embodiments first identify all the active tracks and use a spacetile punch process to punch all the active tracks at once to generate multiple spacetiles to provide greater flexibility to the electronic design implementation tools. In the alternative, some embodiments may invoke the spacetile punch process to punch one or a few active tracks as these embodiments use at least one area-based search probe derived from the spacetiles to find viable solutions.

Another aspect identifies a tracked area associated with a track pattern and a trackless area and use one or more spacetiles and a via spacetile layer to transition between the tracked area and the trackless area for implementation of the electronic design in the tracked or the trackless area of the electronic design. In some of these embodiments, both the tracked area and the trackless area belong to the same layer of the electronic design. In some other embodiments, the tracked area and the trackless area belong to different layers of the electronic design.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a methods, systems, and articles of manufacture for implementing high current carrying interconnects. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for associating track patterns with rules for electronic designs in one or more embodiments. One aspect is directed at associating a rule with one or more track patterns by at least creating or identifying a rule that is used to guide electronic design implementation tools to implement electronic designs, identifying or creating one or more track patterns, and associating the created or identified rule with the one or more track patterns. As the rule is used to guide physical implementation tools, the association of a rule and track patterns enables the physical implementation tools to implement an electronic design while satisfying both the requirements or constraints of the rule and the requirements or constraints of the track patterns.

Another aspect is directed at interpretation or automatic association or assignment of a layer constraint (e.g., a track-Pattern constraint) by at least determining whether a track pattern on a layer with a first rule match a second rule, and adding the track pattern to the layer constraint for the second rule on the layer. Another aspect is directed at automatic creation of a rule by creating a new rule, examining each track pattern associated with a first rule, determining whether the new rule matches the first rule, and adding the track pattern to a layer constraint (e.g., a trackPattern constraint) for the new rule. Various details of any of the processes, sub-processes, or acts are further provided below with reference to respective drawing figures.

Figure 1:
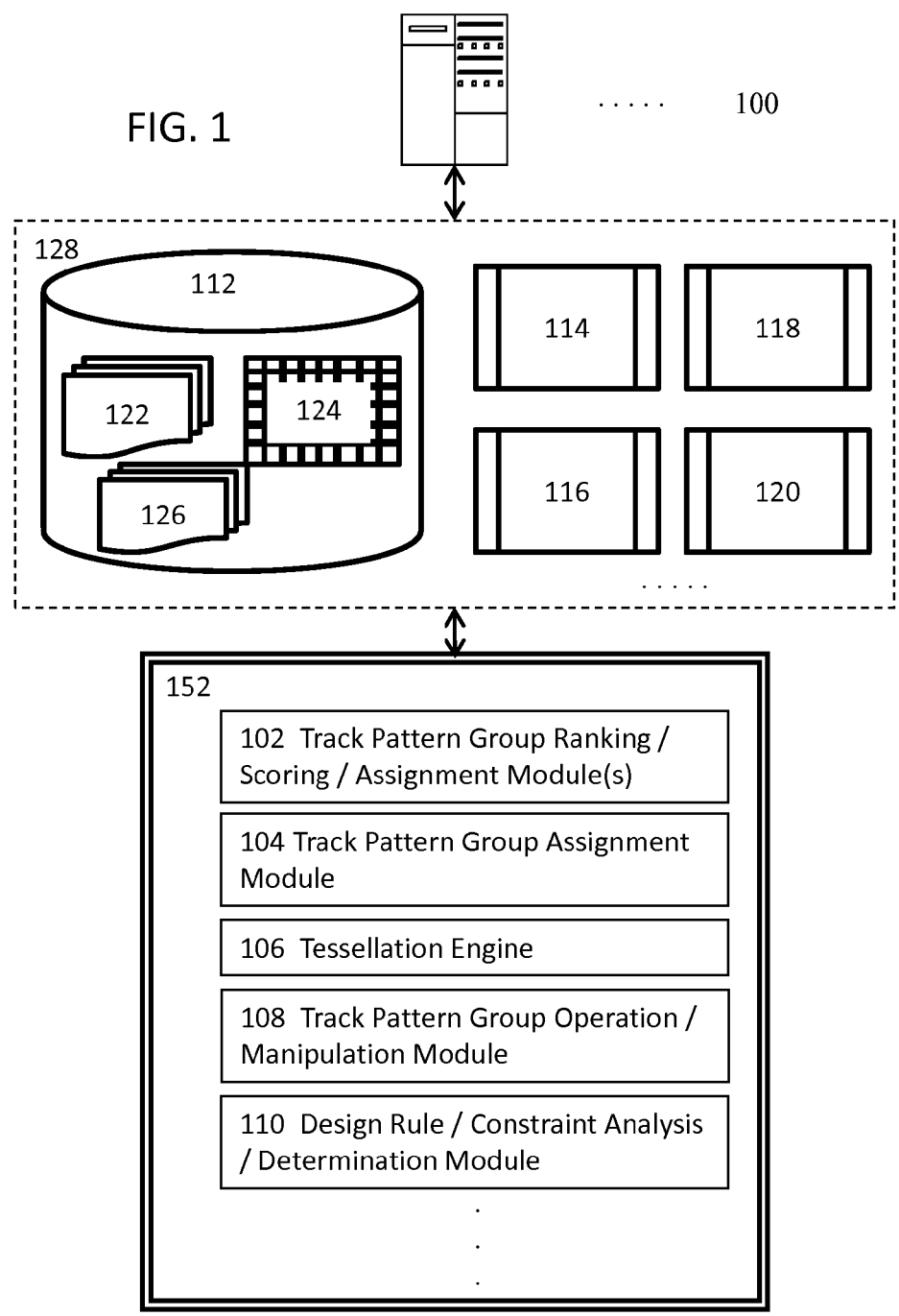
FIG. 1 illustrates a high level block diagram for a system for implementing a physical electronic design with area-bounded tracks in some embodiments.

FIG. 1 illustrates a high level block diagram for a system for implementing a physical electronic design with area-bounded tracks in some embodiments. In one or more embodiments, the system for interactively implementing physical electronic designs with track patterns may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a global routing engine and/or a detail routing engine 114, a layout editor 116, a design rule checker 118, a verification engine 120, a floorplanner, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), libraries, data, rule decks, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises a track pattern or track pattern group module 102 to rank or score a plurality of track patterns based on one or more criteria, an interactive design editing module 104 to provide the capabilities of interactive editing (e.g., adding, removing, or modifying) any part of an electronic design, a tessellation module 106 to tessellate an area of an electronic design into strips and to tessellate a strip into multiple regions either alone or jointly with one or more other modules, one or more interactive coloring modules 108 to provide interactive coloring capabilities for providing correct-by-construction electronic designs to be manufactured with multi-exposure techniques, various physical implementation tools such as a global router or a detail router, a layout or physical design editor, one or more modules 110 to perform design rule checks, constraint analysis (e.g., interactive constraint analysis), or to make various determinations, a constraint or connectivity awareness module 112 to provide a constraint and/or connectivity-aware environment to implement electronic designs, etc.

For example, the method or system may interactively check whether an electronic design complies with various constraints or design rules (collectively constraints), such as some net-based spacing constraints that impose some limitations on the spacing between two nets, in a nearly real-time manner while the electronic design is being created in some embodiments. In these embodiments, the disclosed method or system uses the connectivity information provided by a connectivity engine or assigned by a designer to present feedback to a user as to whether a newly created object or a newly modified object complies with or violates certain relevant constraints in an interactive manner or in nearly real-time without having to perform such constraints checking in batch mode. More details about the aforementioned modules will become clear and self-explanatory in the remainder of the description with reference to various other drawing figures.

Figure 2:
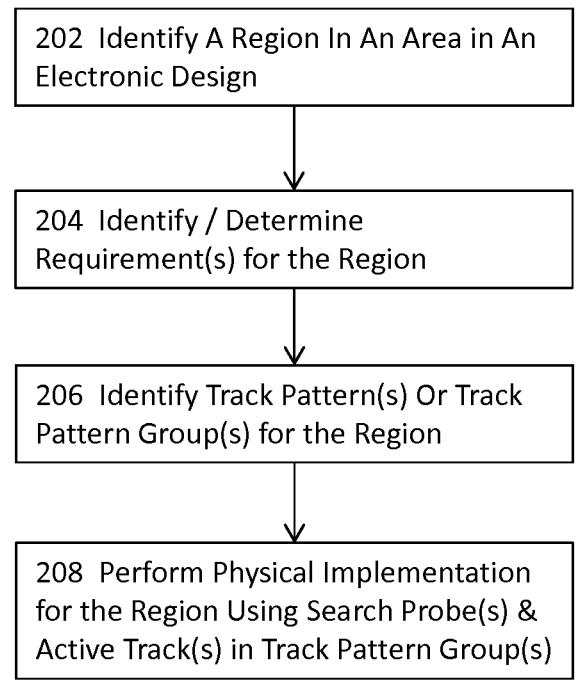
FIG. 2 illustrates a high level flow diagram for implementing a physical electronic design with area-bounded tracks in some embodiments.

FIG. 2 illustrates a high level flow diagram for implementing a physical electronic design with area-bounded tracks in some embodiments. In one or more embodiments, the method for implementing a physical electronic design with area-bounded tracks may comprise the process 202 of identifying a region in an area in an electronic design. A region may comprise at least a portion of a layer of an electronic design in some embodiments. A region may also comprise a tessellated sub-area from a strip in some embodiments. A region may be automatically generated by various processes (e.g., tessellation processes) or manually, custom defined by user (e.g., using a pointing device to define a region). More details about the region obtained from tessellating a strip are described in U.S. patent application Ser. No. 13/931,627 entitled "METHODS, SYSTEMS, AND ARTICLES OF MANUFACTURE FOR ASSIGNING TRACK PATTERNS TO REGIONS OF AN ELECTRONIC DESIGN", the content of which is hereby expressly incorporated by reference in its entirety.

In some of these embodiments, the method may comprise the process 204 of identifying or determining one or more requirements for the region. The one or more requirements may include, for example but not limited to, whether the region is tracked, gridded, gridless, or trackless in some embodiments. In addition or in the alternative, the one or more requirements may include one or more track pattern rules, constraints, or requirements (hereinafter "requirements"), one or more design rules or constraints (e.g., a width rule for interconnects implemented by using tracks in one or more track patterns), whether there is an on-track requirement, and whether or not the on-track requirement is a hard requirement or a soft requirement in some embodiments. A hard requirement must be met, or there is a violation of the requirement. A soft requirement is desired to be satisfied, but failure to meet a soft requirement may simply incur penalties (e.g., a less weighted implementation option when compared to other implementation options that observe the on-track requirement).

In some of these embodiments, the method may comprise the process 206 of identifying one or more track patterns or one or more track pattern groups for the region. More details about the track pattern and track pattern group are described in the four U.S. Patent applications in the section entitled "CROSS-REFERENCE TO RELATED APPLICATION(S)" of this application.

In some of these embodiments, the method may comprise the process 208 of performing physical implementation for the region using one or more area-based search probes and one or more active tracks in the track patterns or track pattern groups identified at 206. An area probe may be used to store information such as the information about the spacetile itself, various information about routing the interconnect (e.g., destination location, beginning location, etc.) in some embodiments. More details about area-based search probes are described in the two U.S. patent applications in the section entitled "CROSS-REFERENCE TO RELATED APPLICATION(S)" of this application.

Figure 3:
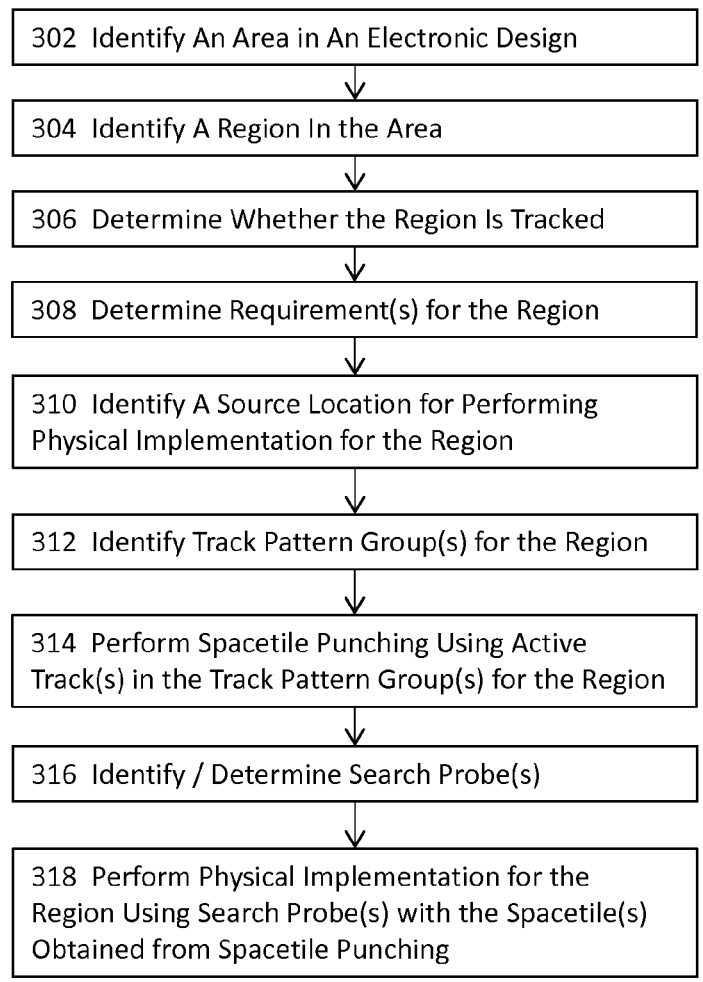
FIG. 3 illustrates a flow diagram for implementing a physical electronic design with area-bounded tracks in some embodiments.

FIG. 3 illustrates a flow diagram for implementing a physical electronic design with area-bounded tracks in some embodiments. In one or more embodiments, the method for implementing a physical electronic design with area-bounded tracks may comprise the process 302 of identify an area in an electronic design in a substantially similar manner as that described for 202 of FIG. 2.

In some of these embodiments, the method may comprise the process 304 of identify a region in the area. A region may comprise a smaller portion of the area identified at 302 or may comprise a sub-area obtained by tessellating a strip as described in 202 of FIG. 2.

In some of these embodiments, the method may comprise the process 306 of determining whether the region is tracked. Various embodiments also apply with full and equal effects to gridded and gridless as well as tracked and trackless electronic circuit designs. A tracked area is an area that is covered with tracks. A track may comprise a line of zero thickness on which the centerline of an interconnect lies. In some embodiments where a preferred or default routing direction is defined, a track along the preferred or default routing direction is called a right-way track. A track that does not lie along the preferred or default routing direction is called a wrong-way track in these embodiments. An area covered with tracks in only one direction (e.g., the preferred routing direction) is called a tracked area. An area covered by tracks in two directions (e.g., preferred and non-preferred routing direction) is called a gridded area. Therefore, a gridless area is an area that is not gridded, but a gridless area may nonetheless be tracked.

On the other hand, a trackless area is one that is not covered by tracks and consequently is also gridless. It shall be noted that the aforementioned definitions of right-way tracks and wrong-way tracks are not limited to Manhattan routing directions that are perpendicular to each other and may also applied to two routing directions at an oblique angle for a given layer. In some embodiments where a layer is associated with some tracks, the layer may be deemed "tracked" or "track-based", which are used interchangeably in this application. A layer will be deemed trackless or not track-based if the layer is not associated with any tracks (e.g., no right-way tracks and wrong-way tracks.)

It shall be noted that various embodiments disclosed herein apply with full and equal effects to any tracked or trackless layer and also to any gridded or gridless layer. If shall also be noted that various embodiments disclosed herein apply with equal effect to a layer which may include tracks (right-way tracks or both right-way and wrong-way tracks) in a smaller portion of the layer whereas the remainder of the layer is trackless. If shall also be noted that various embodiments disclosed herein apply with equal effect to a layer which may be gridded in a smaller portion of the layer whereas the remainder of the layer is gridless or even trackless. It shall be further noted that various embodiments disclosed herein apply with equal effect to implement the electronic design from a tracked, trackless, gridded, or gridless region on a layer and another tracked, trackless, gridded, or gridless region on the same layer.

In some of these embodiments, the method may comprise the process 308 of determining one or more requirements for the region in a substantially similar manner as that described in FIG. 2.

In some of these embodiments, the method may comprise the process 310 of identifying a source location for performing physical implementation for the region. A source may comprise a placed circuit feature (e.g., a block such as an IP (intellectual property) block), continuation of an interconnect routed from another region to the current region of interest (e.g., intersection of such an interconnect with the boundary of the current region of interest), a pin, terminal, or a pad, or any other reference point that may serve as a source of routing, etc. For example, process 310 may identify one or more active tracks, at least one of which coincides with the source location.

In some of these embodiments, the method may comprise the process 312 of identify one or more track patterns or one or more track pattern groups for the region in a substantially similar manner as that described for 206 of FIG. 2.

In some of these embodiments, the method may comprise the process 314 of performing a spacetile punch process using some active tracks in the one or more track patterns or one or more track pattern groups identified at 312 for the region. In some embodiments, a spacetile punch process identifies usable routing space in the routing area and subdivides the routing space into one or more spacetiles. A spacetile comprises an n-dimensional geometric entity in the routing space in some embodiments. The method may then identify a spacetile as an area probe to guide a router (e.g., a point-to-point router that routes an interconnect between two points in the design) to perform area search for routing an electronic design. An area-based search probe may be used to store information such as the information about the spacetile itself, various information about routing the interconnect (e.g., destination location, beginning location, etc.) in some embodiments. In some embodiments, the method may further mark or label the spacetiles. A spacetile may be used as an area probe by the method or system to search for viable routing solutions. Regardless of the dimensionality of a spacetile, a space tile is considered an area probe, whereas the zero- and one-dimensional spacetiles are considered degenerated area probes. It shall be noted that the term "maximally spanning spacetile" refers to a spacetile that spans maximally with respect to a local region, e.g., the region of interest in some embodiments. A spacetile punch process comprises a process to create one or more spacetiles. In some embodiments, process 314 punches all active tracks at once to provide greater flexibility for electronic design implementation tools to have more options to choose from to implement the electronic design. In some other embodiments, process 314 only punches some active tracks as the electronic design implementation tools proceed to implement the design. For example, process 314 may punch one active track at a time for the router to route an interconnect in these latter embodiments. More details about the spacetiles and the spacetile process are described in the U.S. patent applications provided in the section entitled "CROSS-REFERENCE TO RELATED APPLICATION(S)" of this application.

In some of these embodiments, the method may comprise the process 316 of identifying or determining one or more area-based probes. An area probe may be used to store information such as the information about the spacetile itself, various information about routing the interconnect (e.g., destination location, beginning location, etc.) in some embodiments.

In some of these embodiments, the method may comprise the process 318 of performing physical implementation for the region using one or more search probes with one or more spacetiles obtained from spacetile punch process. For example, process 318 may continue its search along a spacetile using an area-based search probe to find a viable solution (e.g., a routing solution) for the physical implementation for the region of the electronic design.

Figure 4:
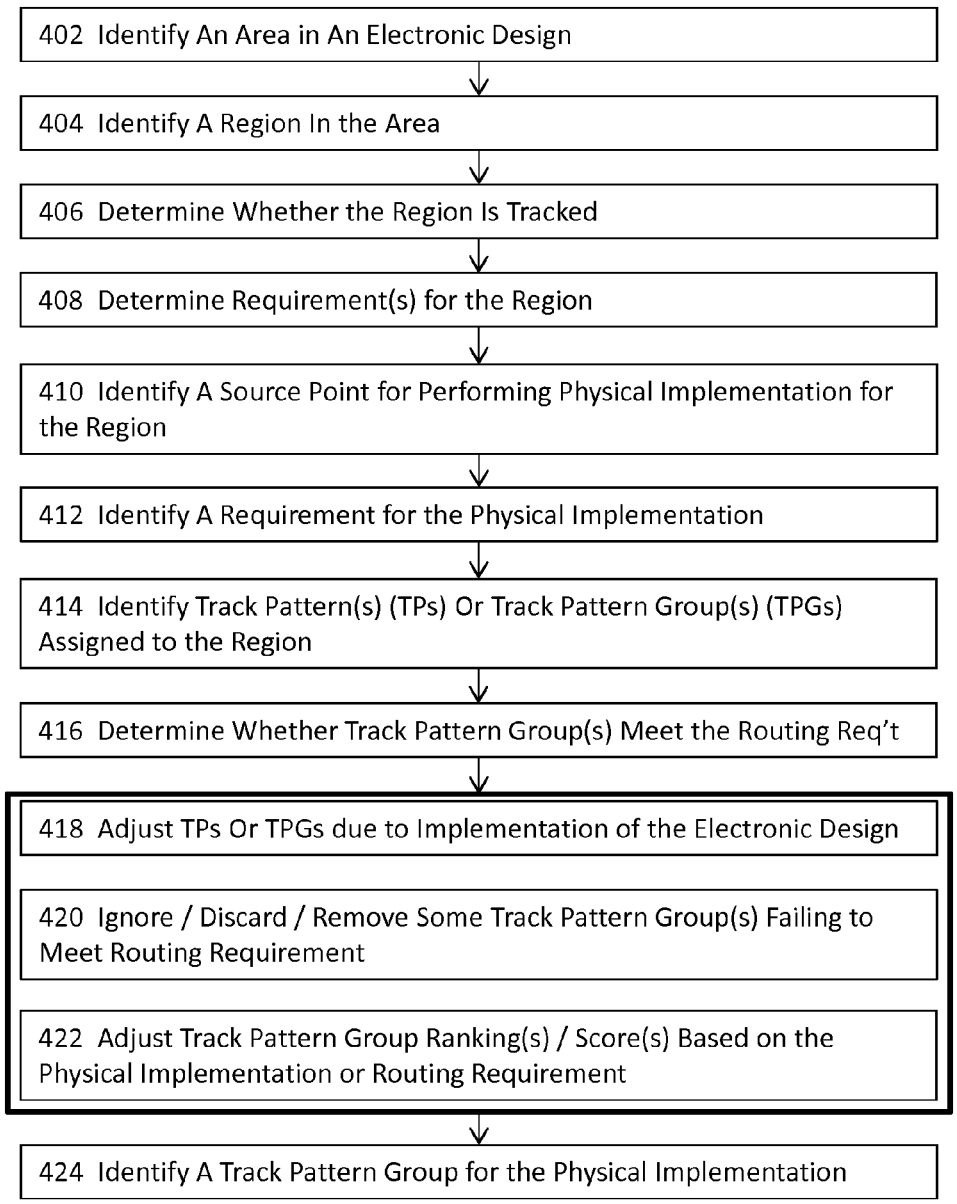
FIG. 4 illustrates a flow diagram for implementing a physical electronic design with area-bounded tracks in some embodiments.

FIG. 4 illustrates a flow diagram for implementing a physical electronic design with area-bounded tracks in some embodiments. In one or more embodiments, the method for implementing a physical electronic design with area-bounded tracks may comprise the process 402 of identifying an area in an electronic design in substantially similar manners as those described for 202 of FIG. 2 or 302 of FIG. 3.

In some of these embodiments, the method may comprise the process 404 of identifying a region in the area in substantially similar manners as those described for 302 of FIG. 3.

In some of these embodiments, the method may comprise the process 406 of determining whether or not the region is tracked. In some embodiments where process 406 determines that the area is trackless, the on-track requirements will not be applicable. In these embodiments, the electronic design may be implemented in free-form without considering such requirements.

In some of these embodiments, the method may comprise the process 408 of determining one or more requirements for the region. The one or more requirements may include, for example but not limited to, whether the region is tracked, gridded, gridless, or trackless in some embodiments. In addition or in the alternative, the one or more requirements may include one or more track pattern rules, constraints, or requirements (hereinafter "requirements"), one or more design rules or constraints (e.g., a width rule for interconnects implemented by using tracks in one or more track patterns), whether there is an on-track requirement, and whether or not the on-track requirement is a hard requirement or a soft requirement in some embodiments. A hard requirement must be met, or there is a violation of the requirement. A soft requirement is desired to be satisfied, but failure to meet a soft requirement may simply incur penalties (e.g., a less weighted implementation option when compared to other implementation options that observe the on-track requirement).

In some of these embodiments, the method may comprise the process 410 of identifying a source location for performing physical implementation for the region in a substantially similar manner as that described for 310 of FIG. 3.

In some of these embodiments, the method may comprise the process 412 of identifying a routing requirement for the physical implementation. A routing requirement may comprise a routing rule that requires a certain width or a certain spacing be used for implementing wires or interconnects.

In some of these embodiments, the method may comprise the process 414 of identifying one or more track patterns or one or more track pattern groups that are associated with or assigned to the region of interest identified at 404. More details about association or assignment between a track pattern and a region are described in the U.S. patent applications provided in the section entitled "CROSS-REFERENCE TO RELATED APPLICATION(S)" of this application.

In some of these embodiments, the method may comprise the process 416 of determining whether or not the one or more track patterns or the one or more track pattern groups meet or match the routing requirement. More details about whether a requirement matches a track pattern or a track pattern group are described in the U.S. patent applications provided in the section entitled "CROSS-REFERENCE TO RELATED APPLICATION(S)" of this application.

In some of these embodiments, the method may comprise the process 418 of adjusting the identified one or more track patterns or one or more track pattern groups due to implementation of the electronic design in the area. At the beginning of implementation of an electronic design where the electronic design contains few or even no circuit features, all track patterns may be made available at this early stage of implementation. As more circuit features are added into a region, the characteristics of the added circuit features or the associated rules (e.g., placement rules, routing rules, etc.) may further limit the compatibility and thus the availability of track patterns that may be associated with or assigned to the region. In some embodiments, process 418 may thus adjust the initially identified track patterns or track pattern groups for the region as more circuit features are implemented in the area. More details about adjusting identified track patterns or track pattern groups are described in the U.S. patent applications provided in the section entitled "CROSS-REFERENCE TO RELATED APPLICATION(S)" of this application.

In some of these embodiments, the method may comprise the process 420 of ignoring, discarding, or removing some track patterns or some track pattern groups that fail to meet the identified requirement. For example, process 420 may remove, ignore, or discard any track patterns or track pattern groups (e.g., track patterns having tracks only for 2×-width interconnects) that do not match the width requirement of a routing rule (e.g., a routing rule requiring 1×-width interconnects).

In some of these embodiments, the method may comprise the process 422 of adjusting the rankings or scores of track patterns or track pattern groups based on the physical implementation or routing requirement. More details about adjusting ranking or scores of track patterns or track pattern groups are described in the U.S. patent applications provided in the section entitled "CROSS-REFERENCE TO RELATED APPLICATION(S)" of this application.

In some of these embodiments, the method may comprise the process 424 of identifying a track pattern or a track pattern group for the implementation the electronic design in the region. As described for 418 above, the characteristics of the added circuit features or the associated rules (e.g., placement rules, routing rules, etc.) may further limit the compatibility and thus the availability of track patterns that may be associated with or assigned to the region. Therefore, process 424 may thus identify a track pattern or a track pattern group for the implementation.

Figure 5A:
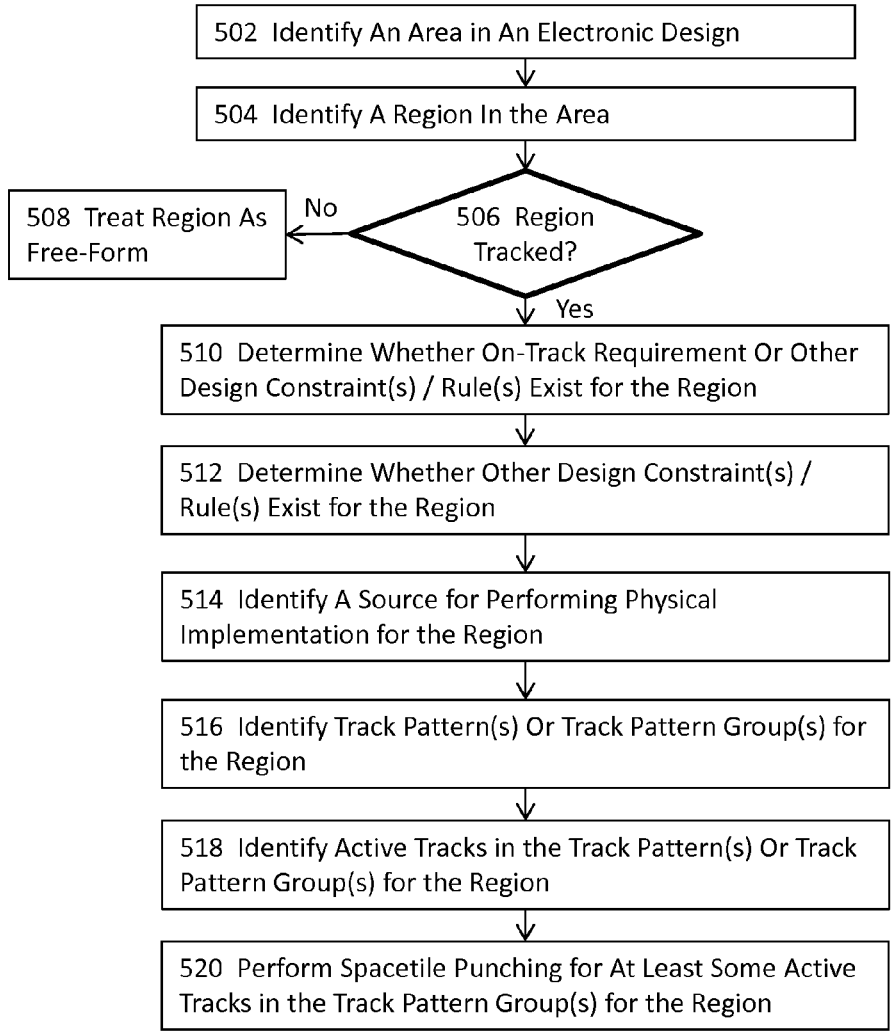
FIGS. 5A-B illustrates flow diagrams for implementing a physical electronic design with area-bounded tracks in some embodiments.
Figure 5B:
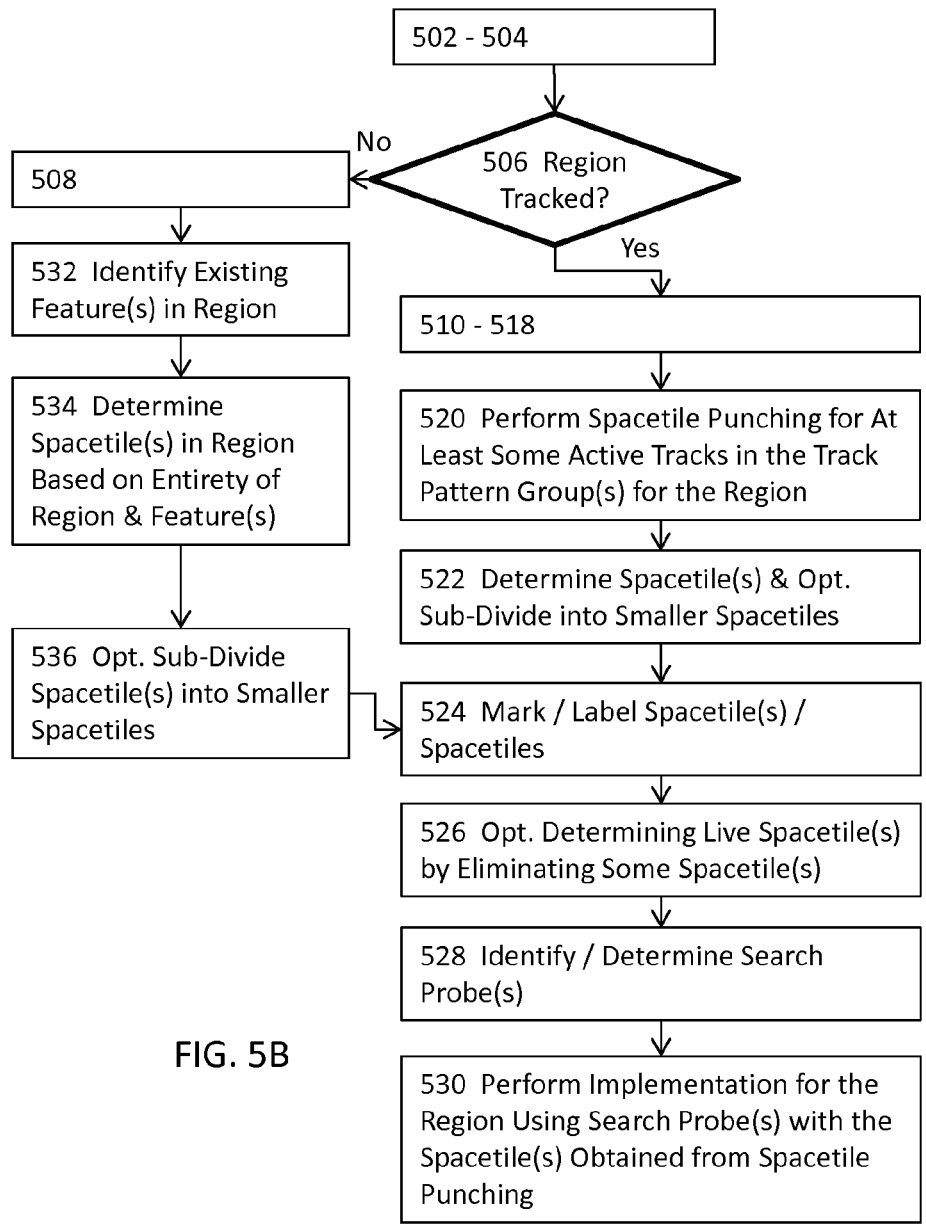

FIGS. 5A-B illustrates flow diagrams for implementing a physical electronic design with area-bounded tracks in some embodiments. In the embodiments illustrated in FIG. 5A, the method for implementing a physical electronic design with area-bounded tracks may comprise the process 5052 of identifying an area in an electronic design and the process 504 for identifying a region in the area.

In some embodiments, the method may comprise the process 506 of determining whether the region is tracked. In some of these embodiments where process 506 determines that the region is trackless, the method may proceed to 508 and treat the region as allowing free-form implementation without observing on-track requirements or other track-based requirements. In some other embodiments where process 506 determines that the region is tracked, the method may proceed to 510.

In some embodiments, the method may comprise the process 510 of determining whether or not the on-track requirement or one or more other design rules, constraints, or requirements (hereinafter "requirements" collectively) exist for the region. The one or more other requirements may include, for example but not limited to, a spacing requirement, a width requirement for interconnects, or other applicable design requirements that are used to guide the physical implementation of the electronic design, etc.

In some embodiments, the method may comprise the process 512 of determining whether or not one or more other design requirements exist for the region. The one or more other design requirements may include, for example but not limited to, one or more track pattern constraints, or one or more layer constraints governing implementation of a layer of the electronic design, etc.

In some embodiments, the method may comprise the process 514 of identifying a source location for performing physical implementation for the region in substantially similar manners as those described for 310 of FIG. 3, or 410 of FIG. 4.

In some embodiments, the method may comprise the process 516 of identifying one or more track patterns or one or more track pattern groups for the region.

In some embodiments, the method may comprise the process 518 of identifying one or more active tracks in the one or more track patterns or one or more track pattern groups for the region. An active track is a track that satisfies various requirements associated with or related to track patterns in some of these embodiments. For example, a track pattern group may comprise 1x-tracks for implementing interconnects with 1x-width and 2x-tracks for implementing interconnects with 2x-tracks. In this example, only the 1x-tracks are deemed active tracks when, for example, a routing rule requires that the interconnects be implemented with 1x-width. As another example, a track pattern group associated with the region of interest may include two sets of tracks, each having a different spacing value. In this example, if a routing rule requires implementing certain interconnects with a spacing value, only the tracks in the set of tracks with the spacing value matching that of the routing rule are deemed active tracks.

In some embodiments, the method may comprise the process 520 of performing the spacetile punch process for at least some active tracks in the track pattern group(s) for the region.

In some embodiments, process 520 punches all active tracks at once to provide greater flexibility for electronic design implementation tools to have more options to choose from to implement the electronic design. In some other embodiments, process 520 only punches some active tracks as the electronic design implementation tools proceed to implement the design. For example, process 520 may punch one active track at a time for the router to route an interconnect in these latter embodiments. Process 520 may be performed in a substantially similar manner as that described for 314 of FIG. 3. In the example provided in the description of 518, process 520 may punch all 1x-tracks at once in some embodiments or one or more, but not all, 1x-tracks in some other embodiments.

In some embodiments illustrated in FIG. 5B, the method implementing a physical electronic design with area-bounded tracks may perform processes 502, 504, and 506 as described in FIG. 5A above. If the process 506 determines that the region is not tracked, the method may proceed to 508 as described in FIG. 5A and then to process 532. If the process 506 determines that the region is tracked, the method may proceed to perform 510-518 in substantially similar manners as those described in FIG. 5A above.

In the embodiments where the method proceeds to and performs 508, the method may further comprise the process 542 of identifying one or more existing features in the identified region and the process 534 of determining one or more spacetiles in the region based at least in part on the entirety of the region or the one or more existing features. For example, process 524 may identify such existing circuit features such as IP blocks, shifters, etc. from, for instance, the floorplanning process. More details about performing the spacetile punching process for an existing circuit feature are described in the U.S. patent applications provided in the section entitled "CROSS-REFERENCE TO RELATED APPLICATION(S)" of this application.

In these embodiments, the method may optionally comprise the process 536 of sub-dividing a single spacetile into multiple, smaller spacetiles. For example, process 536 may partition a single spacetile into multiple, smaller spacetiles to further guide or narrow the search for viable implementation solutions (e.g., viable routing solutions). The method may then proceed to 524, which is described below.

In the embodiments where the method proceeds to and performs 510-518, the method may further comprise the process 520 of performing the spacetile punch process for at least some active tracks in the one or more track patterns or one or more track pattern groups associated with the region.

In these embodiments, the method may comprise the process 522 of determining or identifying one or more spacetiles to be used as search probes. Process 522 may also optionally sub-divide a single spacetile into multiple, smaller spacetiles to further guide or narrow the search for viable implementation solutions (e.g., viable routing solutions).

In these embodiments, the method may comprise the process 524 of marking or labeling at least some of the spacetiles. For example, the method may mark or label a spacetile as "on-track" or "off-track" based on the relationship between the spacetile and a track.

In these embodiments, the method may optionally comprise the process 526 of determining one or more live spacetiles by eliminating one or more spacetiles identified at 522. A live spacetile comprises a spacetile that can be used to implement the electronic design. For example, process 526 may discard or ignore a spacetile that is identified at 522 but fails to meet, for example, the on-track requirement, if the on-track requirement is to be enforced for the implementation of the electronic design in the region.

In these embodiments, the method may comprise the process 528 of identifying or determining one or more search probes that are to be used to find viable implementation solutions (e.g., viable routing solution) for the region.

In these embodiments, the method may comprise the process 530 of implementing the region using the one or more search probes with one or more spacetile obtained from the spacetile punch process. More details about implementing an electronic design using area-based search probes and spacetiles are described in the U.S. patent applications provided in the section entitled "CROSS-REFERENCE TO RELATED APPLICATION(S)" of the current application.

Figure 6:
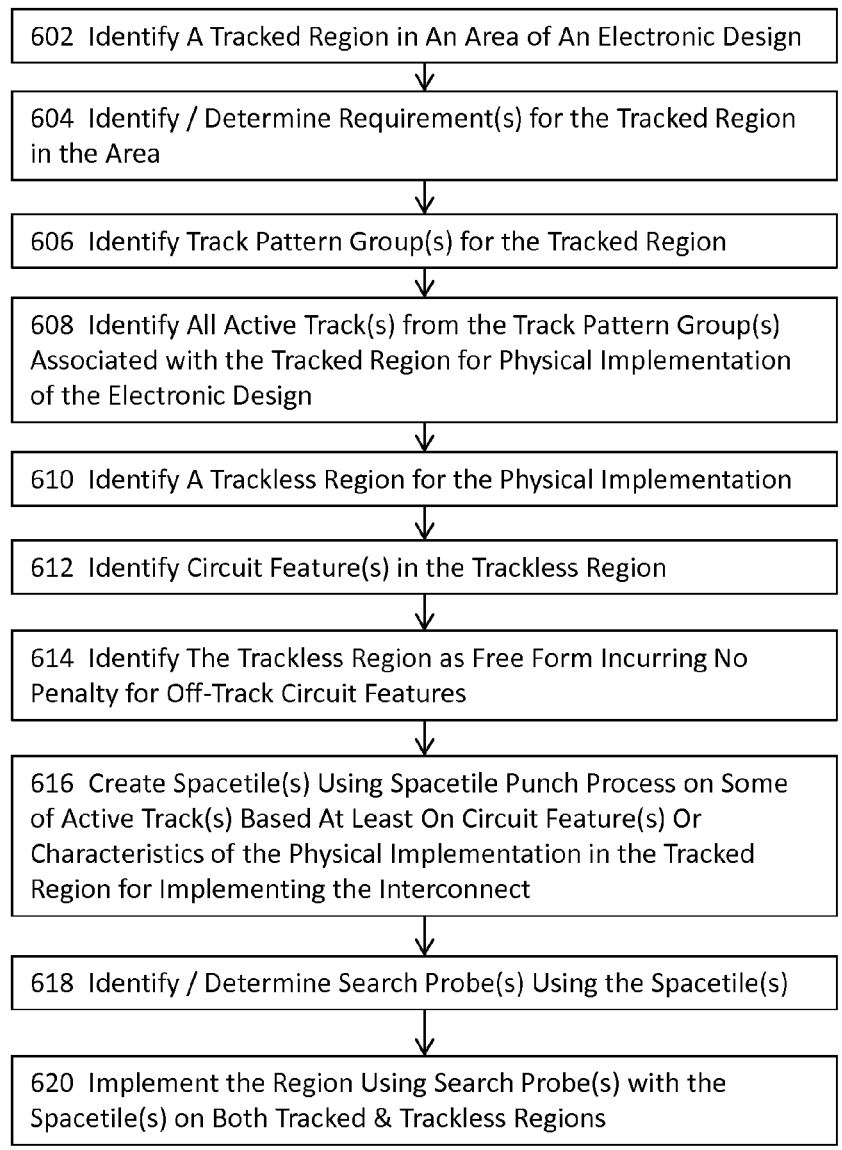
FIG. 6 illustrates a more detailed flow diagram for implementing a physical electronic design with area-bounded tracks in some embodiments.

FIG. 6 illustrates a more detailed flow diagram for implementing a physical electronic design with area-bounded tracks in some embodiments. More specifically, FIG. 6 illustrates a flow diagram of an approach for implementing an electronic design having a tracked region and a trackless region on the same layer by freely transitioning between the tracked region and the trackless region, while observing various track pattern constraints. In one or more embodiments, the method for implementing a physical electronic design with area-bounded tracks may comprise the process 602 of identifying a tracked region in an area of an electronic design.

In some of these embodiments, the method may comprise the process 604 of identifying or determining one or more requirements for the tracked region in the area. Process 604 may be performed in substantially similar manners as those described for 308 of FIG. 3, 204 of FIG. 2, or 408, 412, or 414 of FIG. 4.

In some of these embodiments, the method may comprise the process 606 of identifying one or more track patterns or one or more track pattern groups associated with or assigned to the tracked region. In some of these embodiments, the method may comprise the process 608 of identifying all active tracks from the one or more track patterns or the one or more track pattern groups associated with the tracked region for physical implementation of the electronic design.

In some of these embodiments, the method may comprise the process 610 of identifying a trackless region on the same layer as the tracked region identified at 602 for the physical implementation.

In some of these embodiments, the method may comprise the process 612 of identifying one or more existing circuit features in the trackless region. For example, process 612 may identify such existing circuit features such as IP blocks, shifters, etc. from, for instance, the floorplanning process. A spacetile punch process may operate upon an existing circuit feature to create one or more spacetiles in the trackless region. The method illustrated in FIG. 6 may thus leverage such one or more spacetiles in the trackless region to conduct its search for viable implementation solutions. Nonetheless, an area-based search probe, such as a search probe from a tracked region, may be extended. Therefore, during a transition from a tracked region (e.g., the region identified at 602) to a trackless region (e.g., the region identified at 610), the method may extend an area-based search probe into the trackless region, which is treated as allowing free-form implementation, to find viable implementation solutions in some embodiments.

In some of these embodiments, the method may comprise the process 614 of identifying the trackless region as a region for free form implementation that incurs no penalty for off-track circuit features.

In some of these embodiments, the method may comprise the process 616 of creating one or more spacetiles by using a spacetile punch process to punch at least some of the active track based at least in part upon one or more existing circuit features or one or more characteristics of the physical implementation in the tracked region for implementing the interconnect. In some embodiments where the trackless region contains no existing components, the method may extend a search probe or a spacetile from another region (e.g., from the tracked region identified at 602) to continue the search for viable implementation solutions. In some embodiments where the implementation transitions from a trackless region to a tracked region, the method may determine an area-based search probe based on the spacetile obtained by performing the spacetile punch process on the source location of the implementation and extends the area-based search probe based on, for example, the destination location of the implementation. Therefore, various embodiments described herein apply to transitioning, in either direction, between a tracked region and a trackless region on the same layer with full and equal effects.

In some of these embodiments, the method may comprise the process 618 of identifying or determining one or more search probes using one or more spacetiles. Process 618 may be performed in substantially similar manners as those described for 316 and 528 of FIGS. 3 and 5B respectively.

In some of these embodiments, the method may comprise the process 620 of implementing the region using the one or more search probes with the spacetiles that are obtained through performing the spacetile punch process on the active tracks of one or more track patterns in the tracked region and the one or more existing features in the trackless region.

Figure 7A:
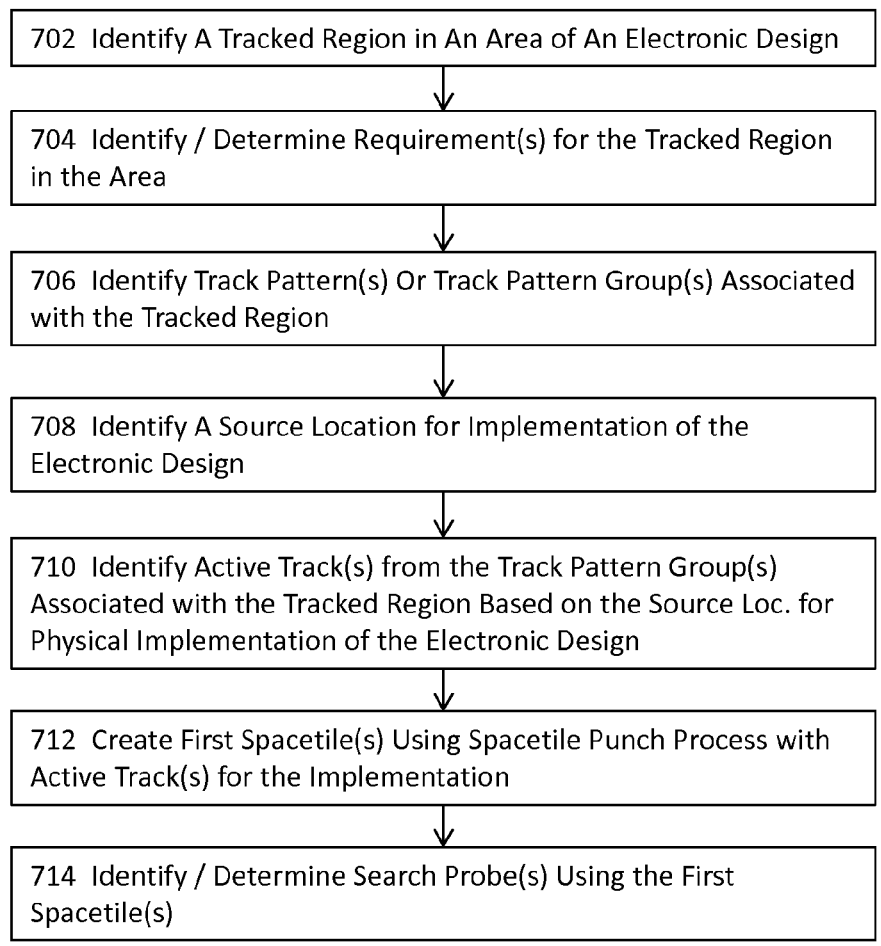
FIGS. 7A-B jointly illustrate a more detailed flow diagram for implementing a physical electronic design with area-bounded tracks in some embodiments.
Figure 7B:
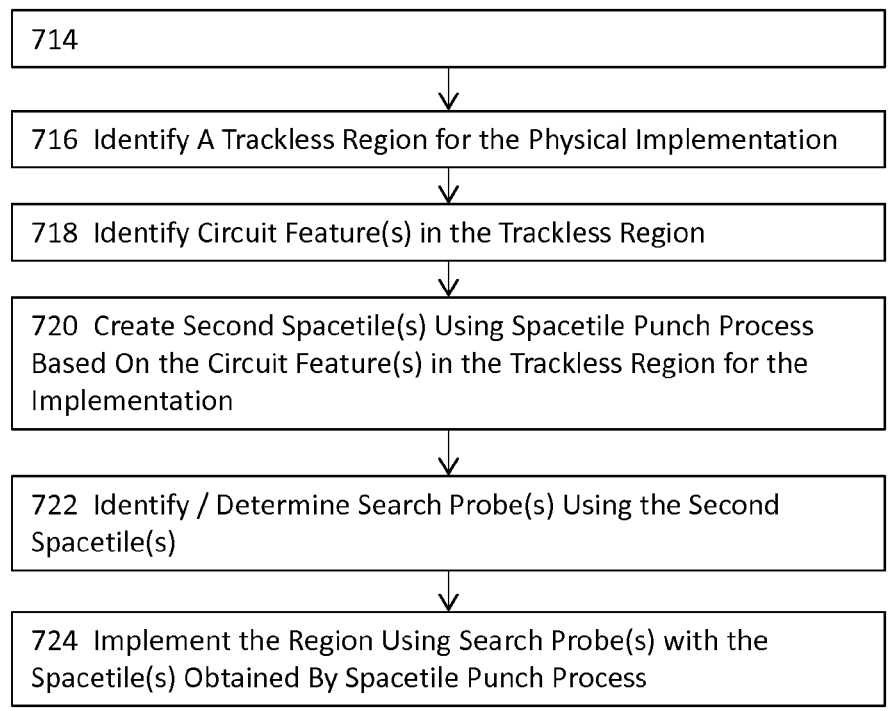

FIGS. 7A-B jointly illustrate a more detailed flow diagram for implementing a physical electronic design with area-bounded tracks in some embodiments. In one or more embodiments, the method for implementing a physical electronic design with area-bounded tracks may comprise the process 702 of identifying a tracked region in an area of an electronic design.

In some of these embodiments, the method may comprise the process 704 of identifying or determining one or more requirements for the tracked region in the area. The one or more requirements may include, for example but not limited to, one or more track pattern rules, constraints, or requirements (hereinafter "requirements"), one or more design rules or constraints (e.g., a width rule for interconnects implemented by using tracks in one or more track patterns), whether there is an on-track requirement, and whether or not the on-track requirement is a hard requirement or a soft requirement in some embodiments. Process 704 may be performed in substantially similar manners as those described for 308 of FIG. 3, 204 of FIG. 2, or 408, 412, or 414 of FIG. 4.

In some of these embodiments, the method may comprise the process 706 of identifying one or more track patterns or one or more track pattern groups associated with or assigned to the tracked region. More details about associating a track pattern or a track pattern group to a region are described in the U.S. patent applications provided in the section entitled "CROSS-REFERENCE TO RELATED APPLICATION(S)" of the instant application.

In some of these embodiments, the method may comprise the process 708 of identifying a source location for implementation of the electronic design. In some embodiments, the implementation of the electronic design comprises physical implementation of the electronic design such as floorplanning, placement, or routing.

Process 708 may be performed in substantially similar manners as those described for 514 of FIG. 5, 310 of FIG. 3, or 410 of FIG. 4.

In some of these embodiments, the method may comprise the process 710 of identifying one or more active tracks from the one or more track patterns or the one or more track pattern groups associated with the tracked region based at least in part on the source location for the physical implementation of the electronic design. An active track is a track that satisfies various requirements associated with or related to track patterns in some of these embodiments. Process 710 may be performed in substantially similar manners as those described for 518 of FIG. 5.

In some of these embodiments, the method may comprise the process 712 of creating one or more first spacetiles using a spacetile punch process on the one or more active tracks identified at 710 for the implementation of the electronic design. In some embodiments, process 712 punches all active tracks at least in the tracked region at once to provide greater flexibility for the electronic design implementation tools. In some other embodiments, process 712 punches one or a few active tracks as the electronic design implementation tools proceed to implement the electronic design in the tracked region.

In some of these embodiments, the method may comprise the process 714 of identifying or determining one or more search probes using the one or more first spacetile in substantially similar manners as those described for 316 of FIG. 3, 528 of FIG. 5B, or 618 of FIG. 6.

In some of these embodiments, the method may comprise the process 716 of identifying a trackless region for the physical implementation. A trackless region is one that is not covered by tracks and may be treated as an area allowing for free-form implementation without observing on-track requirements or other track-based requirements because of the absence of tracks in the region.

In some of these embodiments, the method may optionally comprise the process 718 of identifying one or more existing circuit features in the trackless region. A spacetile punch process may operate upon an existing circuit feature to create one or more spacetiles in the trackless region. The method illustrated in FIGS. 7A-B may thus leverage such one or more spacetiles in the trackless region to conduct its search for viable implementation solutions. Nonetheless, an area-based search probe, such as a search probe from a tracked region, may be extended. Therefore, during a transition from a tracked region (e.g., the region identified at 702) to a trackless region (e.g., the region identified at 716), the method may extend an area-based search probe into the trackless region, which is treated as allowing free-form implementation, to find viable implementation solutions in some embodiments.

In some of these embodiments, the method may comprise the process 720 of creating one or more second spacetiles using a spacetile punch process based at least in part upon one or more existing circuit features in the trackless region for the implementation of the electronic design. In some embodiments where the trackless region contains no existing components, the method may extend a search probe or a spacetile from another region (e.g., from the tracked region identified at 702) to continue the search for viable implementation solutions. In some embodiments where the implementation transitions from a trackless region to a tracked region, the method may determine an area-based search probe based on the spacetile obtained by performing the spacetile punch process on the source location of the implementation and extends the area-based search probe based on, for example, the destination location of the implementation. Therefore, various embodiments described herein apply to transitioning, in either direction, between a tracked region and a trackless region on the same layer with full and equal effects.

In some of these embodiments, the method may comprise the process 722 of identifying or determining one or more search probes using the one or more second spacetiles created at 720.

In some of these embodiments, the method may comprise the process 724 of implementing the region using the one or more search probes with the spacetiles obtained by the spacetile punch process on the active tracks in the tracked region and on the existing features or sources location(s) in the trackless region.

Figure 8A:
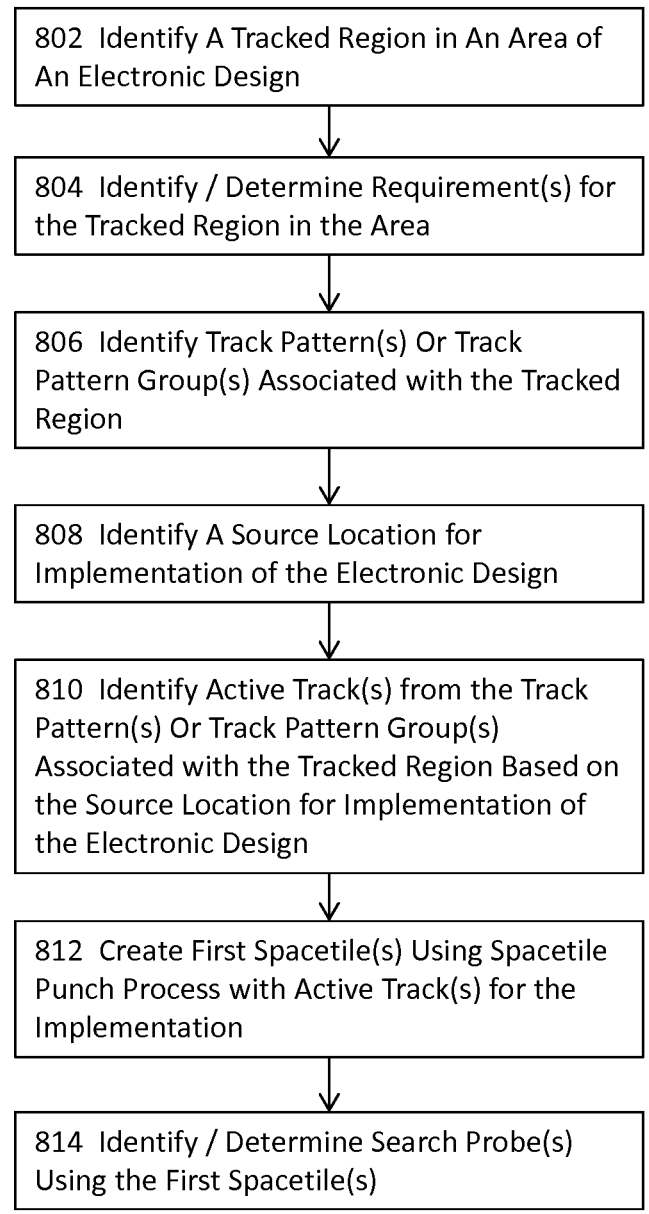
FIGS. 8A-B jointly illustrate a more detailed flow diagram for implementing a physical electronic design with area-bounded tracks in some embodiments.
Figure 8B:
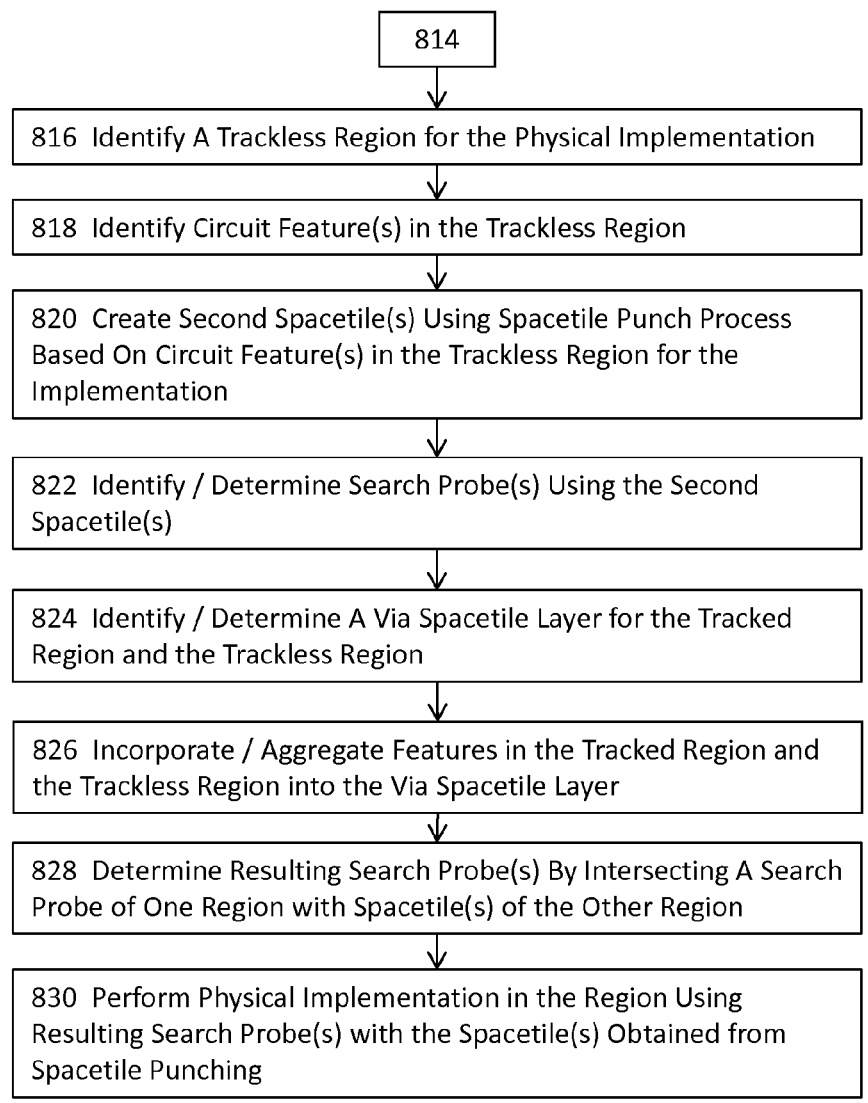

FIGS. 8A-B jointly illustrate a more detailed flow diagram for implementing a physical electronic design with area-bounded tracks in some embodiments. FIGS. 8A-B jointly illustrate a flow diagram for implementing a physical electronic design with area-bounded tracks while transitioning between a tracked region on a first layer and a trackless region on a second layer of the electronic design. In one or more embodiments, the method for implementing a physical electronic design with area-bounded tracks may comprise the process 802 of identifying a tracked region in an area of an electronic design in substantially similar manners as that described for 702 of FIG. 7A or 602 of FIG. 6.

In some of these embodiments, the method may comprise the process 804 of identifying or determining one or more requirements for the tracked region. The one or more requirements may include, for example but not limited to, one or more track pattern rules, constraints, or requirements (hereinafter "requirements"), one or more design rules or constraints (e.g., a width rule for interconnects implemented by using tracks in one or more track patterns), whether there is an on-track requirement, and whether or not the on-track requirement is a hard requirement or a soft requirement in some embodiments. Process 804 may be performed in substantially similar manners as those described for 308 of FIG. 3, 204 of FIG. 2, or 408, 412, 414 of FIG. 4, or 604 of FIG. 6.

In some of these embodiments, the method may comprise the process 806 of identifying one or more track patterns or one or more track pattern groups associated with the tracked region.

In some of these embodiments, the method may comprise the process 808 of identifying a source location for implementation of the electronic design.

In some of these embodiments, the method may comprise the process 810 of identifying one or more active tracks from the one or more track patterns or the one or more track pattern groups associated with the tracked region based at least in part on the source location for implementation of the electronic design. For example, process 810 may identify one or more active tracks, at least one of which coincides with the source location. Process 810 may be performed in substantially similar manners as those described for 514 of FIG. 5, 310 of FIG. 3, or 410 of FIG. 4, 708 of FIG. 7A.

In some of these embodiments, the method may comprise the process 812 of creating one or more first spacetiles using the spacetile punch process with the one or more active tracks in the tracked region for the implementation in substantially similar manners as that described for 712 of FIG. 7A. In some embodiments, process 812 punches all active tracks at once to provide greater flexibility for electronic design implementation tools to have more options to choose from to implement the electronic design. In some other embodiments, process 812 only punches some active tracks as the electronic design implementation tools proceed to implement the design. For example, process 812 may punch one active track at a time for the router to route an interconnect in these latter embodiments.

In some of these embodiments, the method may comprise the process 814 of identifying or determining one or more search probes using at least one of the one or more first spacetiles in substantially similar manners as that described for 714 of FIG. 7A.

In some of these embodiments, the method may comprise the process 816 of identifying a trackless region for the physical implementation and the process 818 of identifying one or more existing circuit features in the trackless region.

In some of these embodiments, the method may comprise the process 820 of creating one or more second spacetiles for the trackless region using the spacetile punch process based at least in part on the one or more existing circuit features in the trackless region for the implementation of the electronic design.

In some of these embodiments, the method may comprise the process 822 of identifying or determining one or more search probes using the one or more second spacetiles created at 820.

In some of these embodiments, the method may comprise the process 824 of identifying or determining a via spacetile layer for the tracked region and the trackless region. In these embodiments, the via spacetile layer serves as an intermediate layer to hold spacetiles for transitioning between a tracked region on a first layer and a trackless layer on a second layer. In some embodiments, a via spacetile layer is created in a volatile memory for an intermediate solution for transitioning between a tracked region on the first layer and a trackless region on the second layer via the via layer, where the results of area probes and spacetiles determined or identified from the transition-from layer for the via spacetile layer are populated to the corresponding transition-to layer for performing area search with the one or more area probes to determine viable routing solutions. More details about the via spacetile layer are described in the U.S. patent applications provided in the section entitled "CROSS-REFERENCE TO RELATED APPLICATION(S)" of the instant application.

In some of these embodiments, the method may comprise the process 826 of incorporating or aggregating one or more existing features in the tracked region and the trackless region into the via spacetile layer. In addition, depending on the transition-from layer, process 826 may also incorporate or aggregate the one or more spacetiles or one or more search probes of the transition-from layer to the via spacetile layer.

In some of these embodiments, the method may comprise the process 828 of determining one or more resulting search probes by intersecting a search probe of the tracked region with one or more spacetile of the trackless region. In the embodiments illustrated by FIGS. 8A-B, the implementation of the electronic design transitions from the tracked region on the first layer to the trackless region on the second layer.

In some of these embodiments, the method may comprise the process 830 of performing implementation in the trackless region using the one or more resulting search probes with the one or more second spacetiles obtained by the spacetile punch process at 820.

Although FIGS. 8A-B jointly illustrates an exemplary approach to transition from a tracked region on a first layer to a trackless region on a second layer, the same approach may also apply to transitioning from a trackless region on a second layer to a tracked region on a first layer with full, equal effects.

Figure 9:
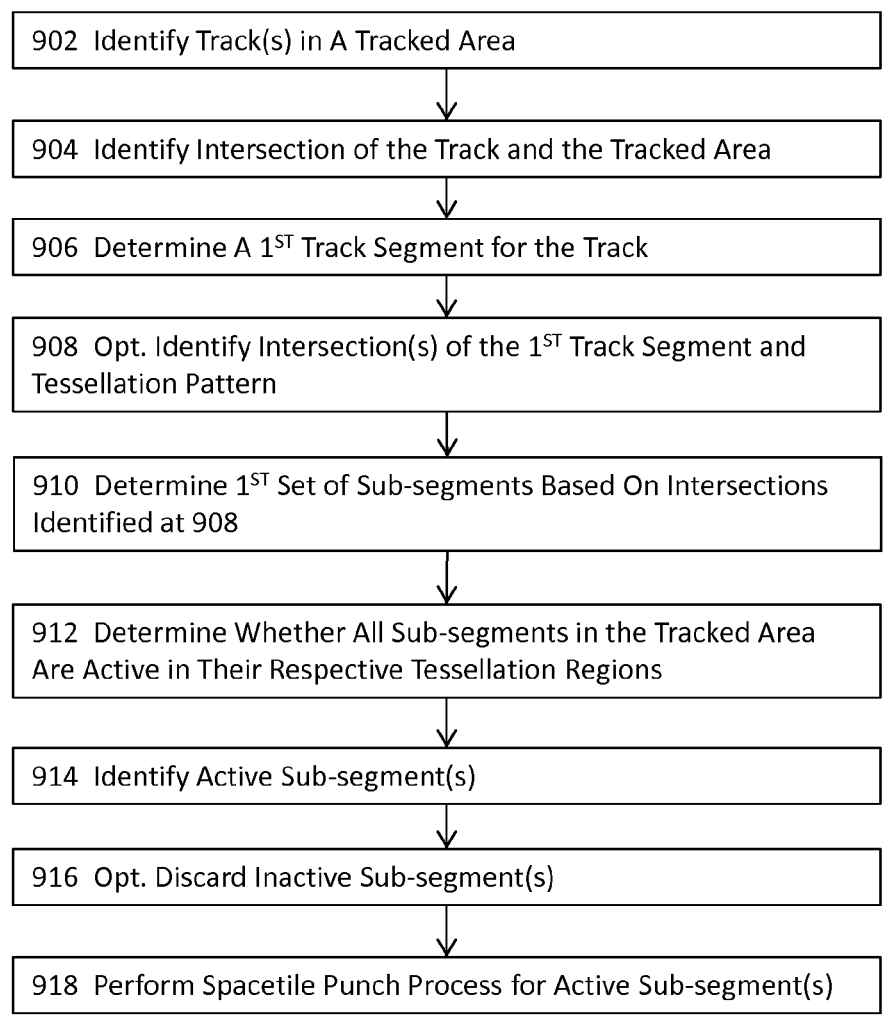
FIG. 9 illustrates a more detailed flow diagram for implementing a physical electronic design with area-bounded tracks in some embodiments.

FIG. 9 illustrates a more detailed flow diagram for implementing a physical electronic design with area-bounded tracks in some embodiments. In one or more embodiments, the method for implementing a physical electronic design with area-bounded tracks may comprise the process 902 of identifying one or more tracks in a tracked area.

In some of these embodiments, the method may comprise the process 904 of identifying intersection of the track and the tracked area. In some of these embodiments, the method may comprise the process 906 of identifying or determining a first track segment for the track.

In some of these embodiments, the method may optionally comprise the process 908 of identifying one or more intersections of the first track segment and the tessellation pattern. U.S. patent application Ser. No. 13/931,627 entitled "METHODS, SYSTEMS, AND ARTICLES OF MANUFACTURE FOR ASSIGNING TRACK PATTERNS TO REGIONS OF AN ELECTRONIC DESIGN" describes, among other things, an approach to tessellate an area of an electronic designs into one or more strips and to further tessellate a strip into multiple regions.

In some of these embodiments, the method may comprise the process 910 of determining a first set of sub-segments based at least in part on the one or more intersections identified at 908. In these embodiments illustrated in FIG. 9, the tessellation pattern in 908 may comprise such multiple regions of a strip. For example, process 902 may identify a track that spans across a strip, which is further tessellated into multiple regions. Process 904 may then identify the intersections between the track and the external boundary of the strip. Process 906 may then use these intersections to determine the first track segment of finite length (e.g., the length of the strip in this example) that begins and ends on the external boundary of the strip. Process 910 may further determine the intersections between the first track segment and the boundaries separating the regions and use these intersections to further partition the first track segment to create multiple track sub-segments. These shorter track sub-segments may provide finer resolution for the area-based search probes to conduct search for viable implementation solutions.

In some of these embodiments, the method may comprise the process 912 of determining whether or not all the sub-segments in the tracked area are active in their respective tessellation regions. In the example of a strip being further tessellated into multiple regions, each region may be associated with one or more track patterns or one or more track pattern groups having different requirements (e.g., different width requirements for interconnects implemented with the tracks in the track pattern or different spacing). Therefore, for a particular implementation, the track sub-segments determined at 910 may not all be active because some regions and hence their corresponding track sub-segments may be associated with requirements that may not comply with the design rules governing the implementation of the design. For example, a first region of a strip may be associated with a first track pattern having 1x-tracks for implementing interconnects with 1x-width, and a second region of the same strip may be associated with a second track pattern having 2x-tracks for implementing interconnects with 2x-width. If a router is determining a routing solution for a net having 1x-width, the track sub-segment in the second region is inactive, whereas the track sub-segment in the first region is active.

In some of these embodiments, the method may comprise the process 914 of identifying one or more active sub-segments. In some of these embodiments, the method may optionally comprise the process 916 of discarding the inactive sub-segments. In the above example provided in 912, process 916 may identify the track sub-segment in the first region and may optionally discard the track sub-segment in the second region.

In some of these embodiments, the method may comprise the process 918 of performing the spacetile punch process for the one or more active sub-segments. The method may then use various processes described above to implement the electronic design in the tracked area by determining one or more area-based search probes using at least the one or more active sub-segments identified at 914 in substantially similar manners as those described above.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

System Architecture Overview

Figure 10:
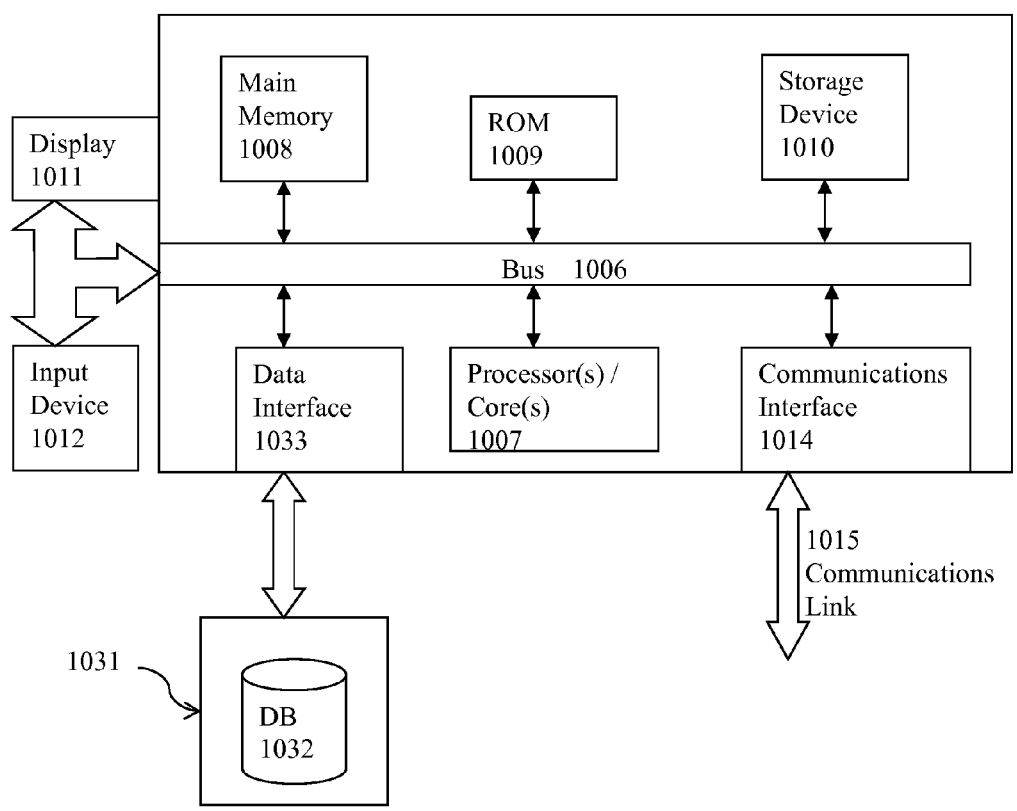
FIG. 10 illustrates a computerized system on which a method for a more detailed flow diagram for implementing a physical electronic design with area-bounded tracks in some embodiments may be implemented.

FIG. 10 illustrates a block diagram of an illustrative computing system 1000 suitable for implementing a physical electronic design with area-bounded tracks as described in the preceding paragraphs with reference to various figures. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment, computer system 1000 performs specific operations by one or more processor or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1007, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for implementing a physical electronic design with area-bounded tracks, comprising:

executing a sequence of instructions with at least one processor or at least one processor core of a computing system to perform a process, the process comprising:
   identifying a region and a first region operatively coupled to the region in an area of an electronic design;
   identifying a track pattern for the region and a first track pattern for the first region, wherein the track pattern includes multiple tracks used for implementing the region of the electronic design, and the track pattern and the first track pattern have different combinations of widths or spacing values associated with respective tracks; and
   implementing the region and the first region of the electronic design by using at least an area probe derived from a track in the track pattern.

2. The computer implemented method of claim 1, the process further comprising:
- determining whether or not the region is tracked; and
- performing a spacetile punch on the track in the track pattern to create a spacetile, wherein the spacetile is used for the area probe.

3. The computer implemented method of claim 2, the process further comprising:
- determining whether the track is active; and
- using the area probe to search for viable solutions for implementing the region of the electronic design.

4. The computer implemented method of claim 1, the process further comprising:
- determining whether an on-track requirement is a hard requirement, a soft requirement, or a don't-care requirement for the region;
- determining a penalty for violation of the on-track requirement, where the on-track requirement is determined to be a soft requirement; and
- permitting free-form implementation in the region of the electronic design, where the on-track requirement is determined to be a don't-care requirement.

5. The computer implemented method of claim 1, the process further comprising:
- identifying all active tracks in the track pattern associated with the region;
- performing a spacetile punch process on the all active tracks in the track pattern to form multiple spacetiles prior to implementing the region of the electronic design; and
- determining the area probe by using the multiple spacetiles.

6. The computer implemented method of claim 1, the process further comprising:
- identifying all active tracks in the track pattern associated with the region;
- updating the area probe during implementation of the region of the electronic design by performing a spacetile punch process on a number of active tracks fewer than a total number of the all active tracks; and
- implementing the region of the electronic design by using the area probe that is updated during and prior to completion of implementation of the region of the electronic design.

7. The computer implemented method of claim 1, the process further comprising:
- identifying a boundary for the region;
- determining intersections between the track and the boundary of the region; and
- determining a track segment for the track in the track pattern based at least in part upon on the intersections.

8. The computer implemented method of claim 1, the process further comprising:
- identifying an existing circuit feature in the region; and
- determining an additional spacetile by performing a spacetile punch process on the existing circuit feature.

9. A system for implementing a physical electronic design with area-bounded tracks, comprising:
- non-transitory computer readable storage medium storing thereupon program code that includes a sequence of instructions;
- at least one processor or at least one processor core executing the sequence of instructions of the program code to:
  - identify a region and a first region operatively coupled to the region in an area of an electronic design;
  - identify a track pattern for the region and a first track pattern for the first region, wherein the track pattern includes multiple tracks used for implemented the region of the electronic design, and the track pattern and the first track pattern have different combinations of widths or spacing values associated with respective tracks; and
- implement the region and the first region of the electronic design by using at least an area probe derived from a track in the track pattern.

10. The system of claim 9, in which the at least one processor or the at least one processor core is further to:
- execute one or more sets of instructions of multiple sets of instructions to implement the physical electronic design with the area-bounded tracks, wherein:
- a first set of instructions of the multiple sets of instructions comprises a first sequence of instructions which, when executed by the at least one processor, causes the at least one processor to:
  - determine whether or not the region is tracked; and
  - perform a spacetile punch on the track in the track pattern to create a spacetile, wherein the spacetile is used for the area probe;
- a second set of instructions of the multiple sets of instructions comprises a first sequence of instructions which, when executed by the at least one processor, causes the at least one processor to:
  - determine whether an on-track requirement is a hard requirement, a soft requirement, or a don't-care requirement for the region;
  - determine a penalty for violation of the on-track requirement, where the on-track requirement is determined to be a soft requirement; and
  - permit free-form implementation in the region of the electronic design, where the on-track requirement is determined to be a don't-care requirement; and
- a third set of instructions of the multiple sets of instructions comprises a first sequence of instructions which, when executed by the at least one processor, causes the at least one processor to:
  - identify all active tracks in the track pattern associated with the region;
  - perform a spacetile punch process on the all active tracks in the track pattern to form multiple spacetiles prior to implementing the region of the electronic design; and
  - determine the area probe by using the multiple spacetiles.

11. The system of claim 10, in which the at least one processor or the at least one processor core is further to:
- determine whether the track is active; and
- use the area probe to search for viable solutions for implementing the region of the electronic design.

12. The system of claim 9, in which the at least one processor or the at least one processor core is further to:
- execute one or more sets of instructions of multiple sets of instructions to implement the physical electronic design with the area-bounded tracks, wherein
- a first set of instructions of the multiple sets of instructions comprises a first sequence of instructions which, when executed by the at least one processor, causes the at least one processor to:
  - identify all active tracks in the track pattern associated with the region;
  - update the area probe during implementation of the region of the electronic design by performing a spacetile punch process on a number of active tracks fewer than a total number of the all active tracks; and implement the region of the electronic design by using the area probe that is updated during and prior to completion of implementation of the region of the electronic design;

a second set of instructions of the multiple sets of instructions comprises a first sequence of instructions which, when executed by the at least one processor, causes the at least one processor to:
identify a boundary for the region;
determine intersections between the track and the boundary of the region; and
determine a track segment for the track in the track pattern based at least in part upon on the intersections; and a third set of instructions of the multiple sets of instructions comprises a first sequence of instructions which, when executed by the at least one processor, causes the at least one processor to:
identify an existing circuit feature in the region; and
determine an additional spacetile by performing a spacetile punch process on the existing circuit feature.

13. The system of claim 9, in which the at least one processor or the at least one processor core is further to:
determine whether or not the region is tracked; and
perform a spacetile punch on the track in the track pattern to create a spacetile, wherein the spacetile is used for the area probe.

14. An article of manufacture comprising a non-transitory computer accessible storage medium having stored thereupon a sequence of instructions which, when executed by at least one processor or at least one processor core executing one or more threads, causes the at least one processor or the at least one processor core to perform a method for implementing a physical electronic design with area-bounded tracks, the method comprising:
identifying a region and a first region operatively coupled to the region in an area of an electronic design;
identifying a track pattern for the region and a first track pattern for the first region, wherein the track pattern includes multiple tracks used for implemented the region of the electronic design, and the track pattern and the first track pattern have different combinations of widths or spacing values associated with respective tracks; and
implementing the region and the first region of the electronic design by using at least an area probe derived from a track in the track pattern.

15. The article of manufacture of claim 14, the process further comprising:
determining whether or not the region is tracked; and
performing a spacetile punch on the track in the track pattern to create a spacetile, wherein the spacetile is used for the area probe.

16. The article of manufacture of claim 15, the process further comprising:
determining whether the track is active; and
using the area probe to search for viable solutions for implementing the region of the electronic design.

17. The article of manufacture of claim 15, the process further comprising:
determining whether an on-track requirement is a hard requirement, a soft requirement, or a don't-care requirement for the region;
determining a penalty for violation of the on-track requirement, where the on-track requirement is determined to be a soft requirement; and permitting free-form implementation in the region of the electronic design, where the on-track requirement is determined to be a don't-care requirement.

18. The article of manufacture of claim 15, the process further comprising:
identifying all active tracks in the track pattern associated with the region;
performing a spacetile punch process on the all active tracks in the track pattern to form multiple spacetiles prior to implementing the region of the electronic design; and
determining the area probe by using the multiple spacetiles.

19. The article of manufacture of claim 15, the process further comprising:
identifying all active tracks in the track pattern associated with the region;
updating the area probe during implementation of the region of the electronic design by performing a spacetile punch process on a number of active tracks fewer than a total number of the all active tracks; and
implementing the region of the electronic design by using the area probe that is updated during and prior to completion of implementation of the region of the electronic design.

20. The article of manufacture of claim 15, the process further comprising:
performing one or more sub-processes of multiple sub-processes, wherein
a first sub-process of the multiple sub-processes comprises:
identifying a boundary for the region;
determining intersections between the track and the boundary of the region; and
determining a track segment for the track in the track pattern based at least in part upon on the intersections; and
a second sub-process of the multiple sub-processes comprises:
identifying an existing circuit feature in the region; and
determining an additional spacetile by performing a spacetile punch process on the existing circuit feature.

21. A computer implemented method for implementing a physical electronic design with area-bounded tracks, comprising executing a sequence of instructions with a processor or a processor core that executes one or more threads in a computing system to perform a process, the process comprising:
identifying a tracked region and a track pattern associated with the first region in an electronic design;
identifying a trackless region in the electronic design; and
implementing at least a part of the tracked region, a part of the trackless region, and transition between the track region and the trackless region.

22. The computer implemented method of claim 21, the process further comprising:
performing one or more sub-processes of multiple sub-processes, wherein
a first sub-process of the multiple sub-processes comprises:
identifying a requirement for the tracked region;
performing a spacetile punch on a track in the track pattern to create a first spacetile for the tracked region; and
implementing the tracked region of the electronic design by using an area probe;

a second sub-process of the multiple sub-process comprises:
- identifying an existing circuit feature in the trackless region; and
- performing a spacetile punch on the existing circuit feature to create a second spacetile for the trackless region; and a third sub-process of the multiple sub-process comprises:
- identifying or creating a via spacetile layer; and
- aggregating existing circuit features in both the tracked region and the trackless region into the via spacetile layer, when the existing circuit features are determined to exist prior to implementation of the electronic design in the tracked region and the trackless region.

23. The computer implemented method of claim 22, the third sub-process further comprising:
- determining or identifying a direction of transitioning between the tracked region and the trackless region;
- selecting one or more spacetiles from either the tracked region or the trackless region based at least in part upon the direction of transitioning; and
- aggregating the one or more spacetiles to the via spacetile layer.

24. The computer implemented method of claim 23, the third sub-process further comprising:
- determining a resulting area probe based at least in part upon the one or more spacetiles that are aggregated to the via spacetile layer; and
- implementing the electronic design by using at least the resulting area probe.

25. The computer implemented method of claim 21, wherein the tracked region and the trackless region are on a same layer or on two different layers of the electronic design.

* * * * *